US007711692B2

(12) United States Patent
Froehlich et al.

(10) Patent No.: US 7,711,692 B2
(45) Date of Patent: May 4, 2010

(54) METHOD, SYSTEM AND PROGRAM PRODUCT FOR REWRITING VIEW STATEMENTS IN STRUCTURED QUERY LANGUAGE (SQL) STATEMENTS

(75) Inventors: Roy Froehlich, North York (CA); Dallas L. Johnson, Tucson, AZ (US); Charles F. Matula, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 957 days.

(21) Appl. No.: 10/987,342

(22) Filed: Nov. 12, 2004

(65) Prior Publication Data

US 2006/0106765 A1 May 18, 2006

(51) Int. Cl.
*G06F 17/30* (2006.01)
(52) U.S. Cl. ..................................................... 707/102
(58) Field of Classification Search ................ 717/137, 717/140; 707/1–6, 102; 340/408
See application file for complete search history.

(56) References Cited

U.S. PATENT DOCUMENTS

| 5,276,870 | A | * | 1/1994 | Shan et al. ..................... 707/2 |
|---|---|---|---|---|
| 5,295,256 | A | * | 3/1994 | Bapat .......................... 717/137 |
| 5,765,147 | A | | 6/1998 | Mattos et al. |
| 5,897,632 | A | | 4/1999 | Dar et al. |
| 5,960,427 | A | * | 9/1999 | Goel et al. ...................... 707/4 |
| 5,991,754 | A | * | 11/1999 | Raitto et al. ..................... 707/2 |
| 6,006,214 | A | | 12/1999 | Carey et al. |
| 6,438,541 | B1 | * | 8/2002 | Witkowski ..................... 707/4 |
| 6,449,605 | B1 | * | 9/2002 | Witkowski ..................... 707/3 |
| 6,477,525 | B1 | * | 11/2002 | Bello et al. ..................... 707/3 |
| 6,496,819 | B1 | | 12/2002 | Bello et al. |
| 6,546,381 | B1 | * | 4/2003 | Subramanian et al. ......... 707/2 |
| 6,721,730 | B2 | * | 4/2004 | Kiernan et al. ................. 707/3 |
| 6,898,588 | B2 | * | 5/2005 | Kosciuszko et al. ............ 707/2 |
| 2003/0126139 | A1 | * | 7/2003 | Lee et al. ..................... 707/100 |

* cited by examiner

*Primary Examiner*—Diane Mizrahi
(74) *Attorney, Agent, or Firm*—Arthur J. Samodovitz

(57) ABSTRACT

Under the present invention, when a SQL statement having a full select portion that references a view containing a join operation (e.g., a LOJ operation) is received, the reference to the view will be moved out of the full select portion. Once moved, the view and its join operation will be resolved separately from the SQL statement. The results of this resolution will be placed in a temporary table. A reference to the temporary table is then inserted in the full select portion, and the SQL statement is thereafter performed.

21 Claims, 2 Drawing Sheets

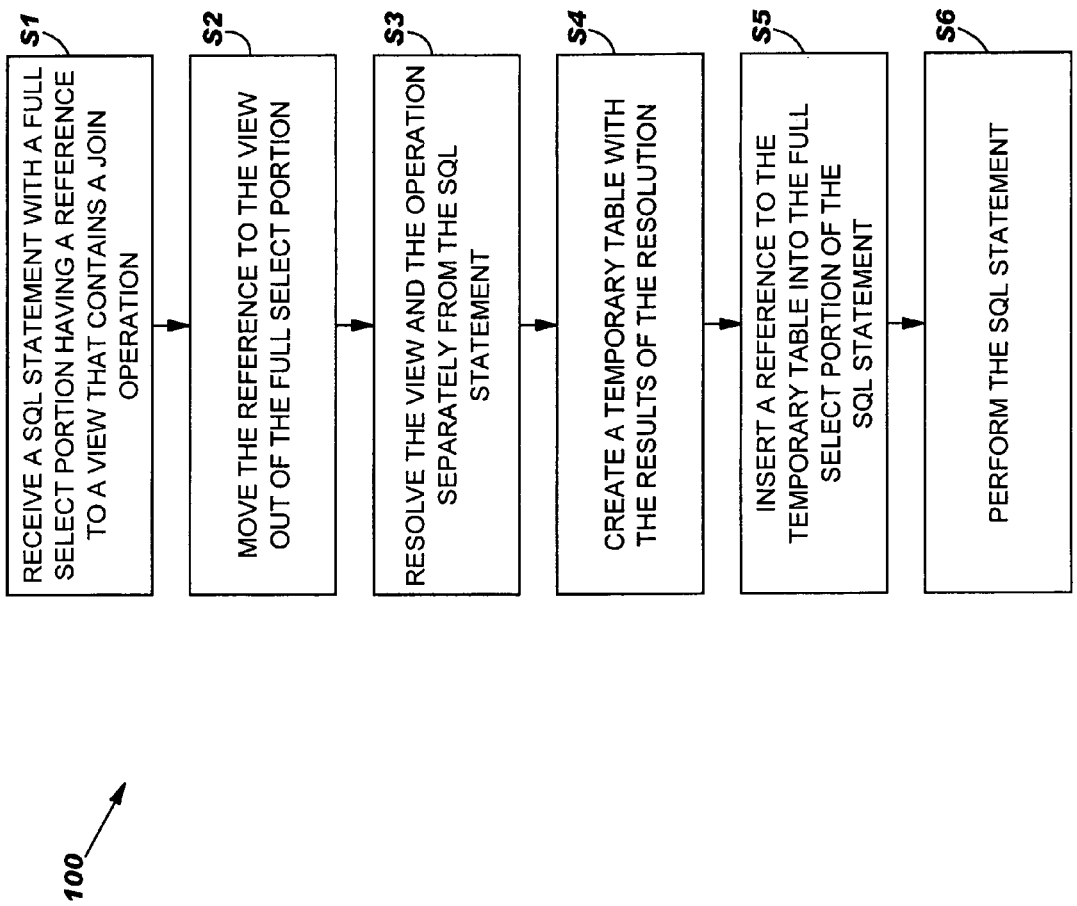

METHOD, SYSTEM AND PROGRAM PRODUCT FOR REWRITING VIEW STATEMENTS IN STRUCTURED QUERY LANGUAGE (SQL) STATEMENTS

BACKGROUND OF THE INVENTION

1. Field of the Invention

The present invention generally relates to SQL statements. Specifically, the present invention relates to rewriting view statements in SQL statements to provide increased performance and speed.

2. Related Art

Structured query language (SQL) is a standard interactive and programming language for getting information to and from a database. Although SQL is both an ANSI and an ISO standard, many database products support SQL with proprietary extensions to the standard language. Queries take the form of a command language that allows a user to select, insert, update and find the location of data.

For example, a simple SQL query may request the rows of a table where a customer purchase order column entry is "123" and an order number is "456." The problem, however, is as follows. Some types of SQL statements contain "full select" statements that reference one or more "views." A "full select" statement includes the "where" (i.e., predicate) part of the query, where the criteria for the search are defined. A "view" is a resultant table that results from an operation(s) performed on other tables specified in the definition of the view. Thus, the "view" specifies the operation and the tables upon which the operation is performed. For example, one table may list all customer purchase order entries whenever ordered, whereas the "view" may specify only those customer purchase order entries from this table made after the year 2000. As such, the view is a subset of the table that lists only those rows from the table where the customer purchase order entries were made after the year 2000.

In some instances, a "view" can be more complicated, such as by containing a Left Outer Join (LOJ) operation. For example, assume that there is a customer ID table and an order table. A LOJ of these two tables will yield a third table with a row for each customer with an order, and a row for each customer without an order. It has been found that when the "full select" portion of the SQL statement includes a reference to a view with an LOJ operation, the search takes a long period of time to complete. Heretofore, no existing solution has been proposed for addressing such latency.

In view of the foregoing, there exists a need for a method, system and program product for rewriting view statements in SQL statements. Specifically, a need exists for a system that can modify a SQL statement such that the "full select" portion will not contain any reference to view containing a LOJ operation.

SUMMARY OF THE INVENTION

In general, the present invention provides a method, system and program product for rewriting view statements in SQL statements. Under the present invention, when a SQL statement having a full select portion that references a view containing a join operation (e.g., a LOJ operation) is received, the reference to the view will be moved out of the full select portion. Once moved, the view and its join operation will be resolved separately from the SQL statement. The results of this resolution will be placed in a temporary table. A reference to the temporary table is then inserted in the full select portion, and the SQL statement is thereafter performed.

A first aspect of the present invention provides a method for rewriting view statements in Structured Query Language (SQL) statements, comprising: receiving a SQL statement with a full select portion having a reference to a view that contains a join operation; moving the reference to the view out of the full select portion; resolving the view and the join operation separately from the SQL statement, and creating a temporary table with a result of the resolving; and inserting a reference to the temporary table in the full select portion.

A second aspect of the present invention provides a system for rewriting view statements in Structured Query Language (SQL) statements, comprising: a system for receiving a SQL statement with a full select portion having a reference to a view that contains a join operation; a system for moving the reference to the view out of the full select portion; a system for resolving the view and the join operation separately from the SQL statement, and creating a temporary table with a result of the resolving; and a system for inserting a reference to the temporary table in the full select portion and thereafter performing the SQL statement.

A third aspect of the present invention provides a program product stored on a recordable medium for rewriting view statements in Structured Query Language (SQL) statements, which when executed, comprises: program code for receiving a SQL statement with a full select portion having a reference to a view that contains a join operation; program code for moving the reference to the view out of the full select portion; program code for resolving the view and the join operation separately from the SQL statement, and creating a temporary table with a result of the resolving; and program code for inserting a reference to the temporary table in the full select portion and thereafter performing the SQL statement.

A fourth aspect of the present invention provides a method for deploying an application for rewriting view statements in Structured Query Language (SQL) statements, comprising: providing a computer infrastructure being operable to: receive a SQL statement with a full select portion having a reference to a view that contains a join operation; move the reference to the view out of the full select portion; resolve the view and the join operation separately from the SQL statement, and create a temporary table with a result of the resolution; and insert a reference to the temporary table in the full select portion and thereafter perform the SQL statement.

A fifth aspect of the present invention provides computer software embodied in a propagated signal for rewriting view statements in Structured Query Language (SQL) statements, the computer software comprising instructions to cause a computer system to perform the following functions: receive a SQL statement with a full select portion having a reference to a view that contains a join operation; move the reference to the view out of the full select portion; resolve the view and the join operation separately from the SQL statement, and create a temporary table with a result of the resolution; and insert a reference to the temporary table in the full select portion and thereafter perform the SQL statement.

Therefore, the present invention provides a method, system and program product for rewriting view statements in SQL statements.

BRIEF DESCRIPTION OF THE DRAWINGS

These and other features of this invention will be more readily understood from the following detailed description of the various aspects of the invention taken in conjunction with the accompanying drawings in which:

FIG. 2 depicts a method flow diagram according to the present invention.

Figure 1:
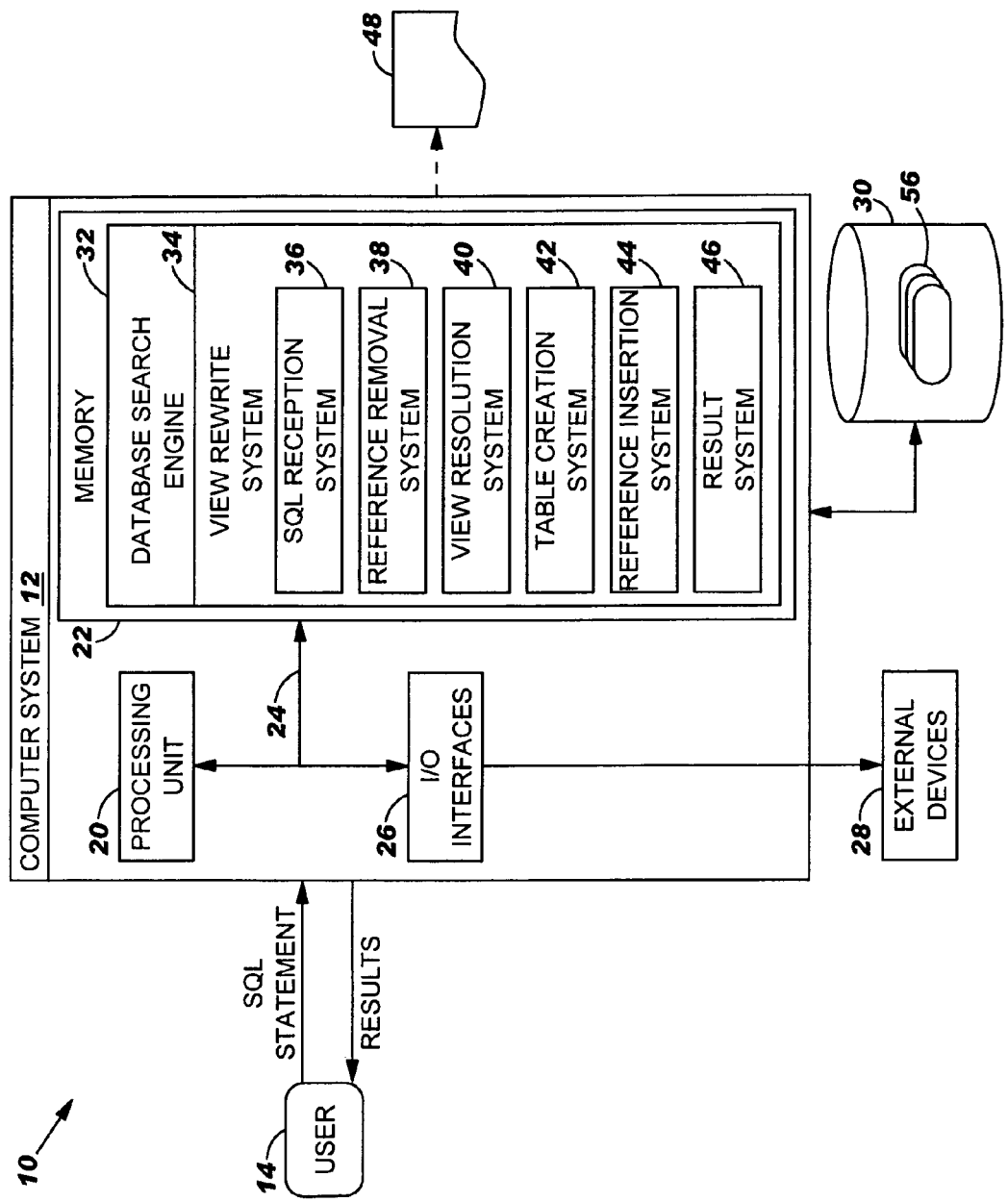
FIG. 1 depicts a system for rewriting view statements in Structured Query Language (SQL) statements according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE DRAWINGS

As indicated above, the present invention provides a method, system and program product for rewriting view statements in SQL statements. Under the present invention, when a SQL statement having a full select portion that references a view containing a join operation (e.g., a LOJ operation) is received, the reference to the view will be moved out of the full select portion. Once moved, the view and its join operation will be resolved separately from the SQL statement. The results of this resolution will be placed in a temporary table. A reference to the temporary table is then inserted in the full select portion, and the SQL statement is thereafter performed.

Referring now to FIG. 1, an illustrative system 10 for rewriting view statements in SQL statements according to the present invention is shown. As depicted, system 10 includes computer system 12, which is intended to represent any type of computer system capable of carrying out the teachings of the present invention. For example, computer system 12 can be a desktop computer, a laptop computer, a workstation, a handheld device, a client, a server, etc. In any event, the teachings of the present invention can be implemented via a stand-alone system as shown, or over a network such as the Internet, a local area network (LAN), a wide area network (WAN), a virtual private network (VPN), etc. In the case of the latter, communication throughout the network could occur via a direct hardwired connection (e.g., serial port), or via an addressable connection that may utilize any combination of wireline and/or wireless transmission methods. Conventional network connectivity, such as Token Ring, Ethernet, WiFi or other conventional communications standards could be used. Still yet, connectivity could be provided by conventional IP-based protocol. In this instance, an Internet service provider could be used to establish interconnectivity.

As further shown, computer system 12 generally includes processing unit 20, memory 22, bus 24, input/output (I/O) interfaces 26, external devices/resources 28 and database 30.

Processing unit 20 may comprise a single processing unit, or be distributed across one or more processing units in one or more locations, e.g., on a client and server. Memory 22 may comprise any known type of computer readable storage media such as magnetic storage media, optical storage media, random access memory (RAM), read-only memory (ROM) and/or a data cache memory. Moreover, similar to processing unit 20, memory 22 may reside at a single physical of physical systems in various forms.

I/O interfaces 26 may comprise any system for exchanging information to/from an external source. External devices/resources 28 may comprise any known type of external device, including speakers, a CRT, LED screen, hand-held device, keyboard, mouse, voice recognition system, speech output system, printer, monitor/display, facsimile, pager, etc. Bus 24 provides a communication link between each of the components in computer system 12 and likewise may comprise any known type of transmission link, including electrical, optical, wireless, etc.

Database 30 can be any type of database capable of providing storage for information (e.g., tables 56, etc.) under the present invention. As such, database 30 could include one or more storage devices, such as a magnetic disk drive or an optical disk drive. In another embodiment, database 30 includes data distributed across, for example, a local area network (LAN), wide area network (WAN) or a storage area network (SAN) (not shown). Although not shown, additional components, such as cache memory, communication systems, system software, etc., may be incorporated into computer system 12.

Shown in memory 22 of computer system 12 as one or more program products is database search engine 32 and view rewrite system 34. Database search engine 32 can be any type of search engine/system now known or later developed that is used to search/query databases and the like. To this extent, database search engine 32 is able to handle SQL statements from a user 14. Under the present invention, database search engine 32 is augmented by view rewrite system 34, which can exist as part of database search engine 32 or it can be provided as a separate component that works in conjunction with database search engine 32 (e.g., a plug-in). As will be explained in greater detail below, view rewrite system 34 "rewrites" view statements that appear within SQL statements received from user 14. Specifically, view rewrite system 34 will move any references to views containing join operations such as LOJ operations from within a full select portion of the SQL statements. Such rewrites will allow considerable time to be saved.

Assume in an illustrative example that the following SQL statement is received from user 14:

```
WITH
t1 (ENTERPRISE_NUM,X) AS (VALUES
('1052000','1')),
t2 (CUST_SOLD_TO,X) AS (VALUES
('0017829593','1')),
t3 (LID)
  AS (SELECT O.LINE_ITEM_ID
  FROM GTM.ORDER_LINE_V O
INNER JOIN t1 ON
t1.ENTERPRISE_NUM = O.ENTERPRISE AND
t1.X='1'),
t4 (LID)
  AS (SELECT O.LINE_ITEM_ID
  FROM GTM.ORDER_LINE_V O
INNER JOIN GTM.CUST_INFO_V CI ON O.LINE_ITEM_ID = CI.LINE_ITEM_ID
INNER JOIN t2 ON
t2.CUST_SOLD_TO = CI.SOLDTO_CUST_NUM AND
t2.X='1'),
  t5 (LID) AS (
```

```
SELECT t3.LID FROM t3
 UNION
SELECT t4.LID FROM t4)
SELECT DISTINCT O.CUSTOMER_PO_NUM, O.FULLFILL_ORD_NUM,
O.PRODUCT_DESC, D.DLS_STATUS, O.PRODUCT_ID, D.DLS_QTY,
O.BUNDLE_INDICATOR, O.IBM_ORD_ENTRY_DTE, O.CRAD_CURRENT,
D.CCAD, CI.SOLDTO_GEO_ID, CI.SHIPTO_CTRY_NAME, O.SOURCE_CD,
O.ORIGINAL_ORDER_NUM, O.PART_NUM, O.SYSTEM_NUM,
O.SYSTEM_TYPE, O.LINE_ITEM_ID, O.FRONT_END_LIN_NUM
FROM t5
INNER JOIN GTM.ORDER_LINE_V O ON t5.LID = O.LINE_ITEM_ID
INNER JOIN GTM.CUST_INFO_V CI ON t5.LID = CI.LINE_ITEM_ID
INNER JOIN GTM.DLS_V D ON t5.LID = D.LINE_ITEM_ID
WHERE (O.IBM_ORD_ENTRY_DTE BETWEEN '2003-09-01' AND '2003-10-01')
AND (D.DLS_STATUS NOT IN ('600'))
ORDER BY O.CUSTOMER_PO_NUM ASC, O.FULLFILL_ORD_NUM ASC,
O.PRODUCT_DESC ASC, D.DLS_STATUS ASC, O.PRODUCT_ID ASC,
O.FULLFILL_ORD_NUM ASC, O.FULLFILL_ORD_NUM ASC
FETCH FIRST 10000 ROWS ONLY;
```

In the above SQL statement, the line of "INNER JOIN GTM.DLS_V D ON t5.LID=D.LINE_ITEM_ID" contains a reference to a view identified as GTM.DLS_V. This line appears within a "full select" portion of the SQL statement (e.g., the section beginning with the line SELECT DISTINCT O.CUSTOMER_PO_NUM, O.FULLFILL_ORD_NUM). The above SQL statement also includes the line WHERE (O.IBM_ORD_ENTRY_DTE BETWEEN '2003-09-01'AND '2003-10-01'). As known, a WHERE clause contains the search criteria for the SQL statement, and is considered to be a "predicate" that sets the boundary of the SQL statement. In any event, assume in this example that the view referenced in the "full select" portion contains a left outer join (LOJ) operation.

Under the present invention, the above illustrative SQL statement will be received by SQL reception system 36 of view rewrite system 34. Upon receipt, reference removal system 38 will analyze the SQL statement and detect the presence of the reference to the view that contains the LOJ operation within the full select portion of the SQL statement. Once detected, reference removal system 38 will move the reference to the view out of the full select portion. Thereafter, view resolution system 40 will resolve the view and its LOJ operation separately from the SQL statement as a whole. That is, the view operation will be performed alone without performing the entire SQL statement. Table creation system 42 will then create a temporary table 48 and populate the same with any results of the resolution of the view operation. Listed below is illustrative SQL for resolving the view operation, and populating temporary table 48 with associated results.

```
CREATE VIEW DLS_V01
 (
  LINE_ITEM_ID,
  DLS_QTY,
  DLS_STATUS,
  DLS_SCHED_ID,
  CCAD,
  SERIAL_NUMBER,
  DELIVERY_DATE,
  SUPPLY_SHIP_DATE,
  ORIG_SCHED_DTE,
  ORIG_ARRIV_DTE,
  PREV_PART_STATUS,
  PREV_SCHED_DTE,
  ITEMSTATUS_DTE,
  NEW_LINEITEM_FLG,
  CARRIER_SCAC_CODE,
  CARRIER_NAME,
  CARRIER_CODE,
  PHONE_1_DESC,
  PHONE_2_DESC,
  SHIP_DATE,
  SHIP_TO_LOC_CD
   ) AS
SELECT
  DLS.LINE_ITEM_ID,
  DLS.DLS_QTY,
  CHAR(DLS.DLS_STATUS),
  DLS.SCHED_ID,
  COALESCE(DLS.NEAD_DTE,SCHED.CCAD),
  DLSSN.SERIAL_NUMBER,
  SHIP.DELIVERY_DATE,
  SCHED.SUPPLY_SHIP_DATE,
  SCHED.ORIG_ARRIV_DTE,
  SCHED.ORIG_SCHED_DTE,
  SCHED.PREV_PART_STATUS,
  SCHED.PREV_SCHED_DATE,
  SCHED.ITEMSTATUS_DTE,
  SCHED.NEW_LINEITEM_FLG,
  CAR.CARRIER_SCAC_CODE,
  CAR.NAME,
  CAR.CARRIER_CODE,
  SHIP.CARRIER_TRACK_NUM,
  CAR.BASE_URL,
SHIP.SHIP_DATE,
  SHIP.SHIP_TO_LOC_CD
  FROM DERIVED_LINE_SEG DLS
  LEFT OUTER JOIN SCHEDULE SCHED    ON
DLS.LINE_ITEM_ID   = SCHED.LINE_ITEM_ID
           AND DLS.SCHED_ID = SCHED.LINE_ITEM_SEQ
  LEFT OUTER JOIN DLS_SERIAL DLSSN ON DLS.ID         =
DLSSN.DLS_ID
  LEFT OUTER JOIN SHIP_LINE_ITEM SL ON
DLS.SHIP_LINE_ITEM_ID = SL.ID
  LEFT OUTER JOIN BSE_SHIPMENT SHIP ON
SL.SHIPMENT_ID     = SHIP.ID
  LEFT OUTER JOIN CARRIER CAR    ON
SHIP.CARRIER_ID     = CAR.ID;
```

After the view and its LOJ operation have been resolved, a reference to the temporary table 48 will be inserted back into the full select portion of the original SQL statement by reference insertion system 44. Listed below is illustrative code showing the inserted reference to temporary table 48.

```
WITH
t1 (ENTERPRISE_NUM,X) AS (VALUES
('1052000','1')),
t2 (CUST_SOLD_TO,X) AS (VALUES
('0017829593','1')),
 t3 (LID)
 AS (SELECT O.LINE_ITEM_ID
 FROM GTM.ORDER_LINE_V O
INNER JOIN t1 ON
t1.ENTERPRISE_NUM = O.ENTERPRISE AND
t1.X='1'),
 t4 (LID)
 AS (SELECT O.LINE_ITEM_ID
 FROM GTM.ORDER_LINE_V O
INNER JOIN GTM.CUST_INFO_V CI ON O.LINE_ITEM_ID = CI.LINE_ITEM_ID
INNER JOIN t2 ON
t2.CUST_SOLD_TO = CI.SOLDTO_CUST_NUM AND
t2.X='1'),
 t5 (LID) AS (
SELECT t3.LID FROM t3
 UNION
SELECT t4.LID FROM t4)
, D (LINE_ITEM_ID,DLS_QTY,DLS_STATUS,
DLS_SCHED_ID,CCAD,PLANT_SHIP_DATE,FF_DEL_REQ_NUM,MFG_DEL_REQ_NUM,
INVOICE_NUM,INV_CREATE_DATE,SERIAL_NUMBER,DELIVERY_DATE,
SUPPLY_SHIP_DATE,ORIG_SCHED_DTE,ORIG_ARRIV_DTE,PREV_PART_STATUS,
PREV_SCHED_DTE,ITEMSTATUS_DTE,NEW_LINEITEM_FLG,CARRIER_SCAC_CODE,
CARRIER_NAME,CARRIER_CODE,CARRIER_TRACK_NUM,CARRIER_BASE_URL,
CARRIER_PHONE_1,CARRIER_PHONE_2,PHONE_1_DESC,PHONE_2_DESC,
SHIP_DATE,SHIP_TO_LOC_CD ) as (SELECT
DLS.LINE_ITEM_ID,DLS.DLS_QTY,CHAR(DLS.DLS_STATUS),DLS.SCHED_ID,
COALESCE(DLS.NEAD_DTE,SCHED.CCAD),DLS.PLANT_SHIP_DATE,DLS.FF_DEL_REQ_NUM,
DLS.MFG_DEL_REQ_NUM,DLS.INVOICE_NUM,DLS.INVOICE_DATE,
DLSSN.SERIAL_NUMBER,SHIP.DELIVERY_DATE,SCHED.SUPPLY_SHIP_DATE,
SCHED.ORIG_ARRIV_DTE,SCHED.ORIG_SCHED_DTE,SCHED.PREV_PART_STATUS,
SCHED.PREV_SCHED_DATE,SCHED.ITEMSTATUS_DTE,SCHED.NEW_LINEITEM_FLG,
CAR.CARRIER_SCAC_CODE,CAR.NAME,CAR.CARRIER_CODE,
SHIP.CARRIER_TRACK_NUM,CAR.BASE_URL,CAR.CARRIER_PHONE_1,
CAR.CARRIER_PHONE_2,CAR.PHONE_1_DESC,CAR.PHONE_2_DESC,SHIP.SHIP_DATE,
SHIP.SHIP_TO_LOC_CD FROM GTM.DERIVED_LINE_SEG DLS inner
join t5 on t5.lid = dls.line_item_id LEFT OUTER JOIN GTM.SCHEDULE SCHED ON
DLS.LINE_ITEM_ID = SCHED.LINE_ITEM_ID AND DLS.SCHED_ID =
SCHED.LINE_ITEM_SEQ LEFT OUTER JOIN GTM.DLS_SERIAL DLSSN ON
DLS.ID = DLSSN.DLS_ID LEFT OUTER JOIN GTM.SHIP_LINE_ITEM SL ON
DLS.SHIP_LINE_ITEM_ID = SL.ID LEFT OUTER JOIN GTM.BSE_SHIPMENT
SHIP ON SL.SHIPMENT_ID = SHIP.ID LEFT OUTER JOIN GTM.CARRIER CAR
ON SHIP.CARRIER_ID = CAR.ID)
SELECT DISTINCT O.CUSTOMER_PO_NUM, O.FULLFILL_ORD_NUM,
O.PRODUCT_DESC, D.DLS_STATUS, O.PRODUCT_ID, D.DLS_QTY,
O.BUNDLE_INDICATOR, O.IBM_ORD_ENTRY_DTE, O.CRAD_CURRENT,
D.CCAD, CI.SOLDTO_GEO_ID, CI.SHIPTO_CTRY_NAME, O.SOURCE_CD,
O.ORIGINAL_ORDER_NUM, O.PART_NUM, O.SYSTEM_NUM,
O.SYSTEM_TYPE, O.LINE_ITEM_ID, O.FRONT_END_LIN_NUM
FROM t5
INNER JOIN GTM.ORDER_LINE_V O ON t5.LID = O.LINE_ITEM_ID
INNER JOIN GTM.CUST_INFO_V CI ON t5.LID = CI.LINE_ITEM_ID
INNER JOIN D ON t5.LID = D.LINE_ITEM_ID
WHERE (O.IBM_ORD_ENTRY_DTE BETWEEN '2003-09-06' AND '2003-10-06')
AND (D.DLS_STATUS NOT IN ('600')) (NOTE: 3)
ORDER BY O.CUSTOMER_PO_NUM ASC, O.FULLFILL_ORD_NUM ASC,
O.PRODUCT_DESC ASC, D.DLS_STATUS ASC, O.PRODUCT_ID ASC,
O.FULLFILL_ORD_NUM ASC, O.FULLFILL_ORD_NUM ASC
FETCH FIRST 10000 ROWS ONLY
```

The section of the above SQL code beginning with the line, D (LINE_ITEM_ID,DLS_QTY,DLS_STATUS, represents the reference to the temporary table 48 (e.g., identified as "D"), as inserted by reference insertion system 44 into the full select portion of the SQL statement. Now, when the SQL statement is performed, the view operation will not be concurrently resolved. Rather, only a reference to temporary table 48 will be needed. This process saves considerable time and resources. In any event, result system 46 can then pass the modified SQL statement to database search engine 32, which will perform the same and provide final results to user 14.

It should be understood that although this illustrative example discussed the movement of references to views containing LOJ operations, any variety of alternatives are possible. For example, the present invention could be implemented to move references to views containing any type of join operations. Moreover, although the SQL statement is described above as being performed by database search engine 32, this need not be the case. For example, result system 46 could itself perform the SQL statement and provide the final results to user 14. This could obviate the need for database search engine 32.

Referring now to FIG. 2, an illustrative method flow diagram 100 according to the present invention is shown. First step S1 is to receive a SQL statement with a full select portion having a reference to a view that contains a join operation. In step S2, the reference to the view is moved out of the full select portion. In step S3, the view and the join operation are resolved separately from the SQL statement. Then, in step S4 a temporary table containing the results of the resolution is created. In step S5, a reference to the temporary table is inserted into the full select portion. Then, in step S6, the modified SQL statement is performed.

It should be appreciated that the present invention could be offered as a business method on a subscription or fee basis. For example, computer system 12 and/or view rewrite system 34 could be created, supported, maintained and/or deployed by a service provider that offers the functions described herein for customers. That is, a service provider could offer to rewrite view statements for customers.

It should also be understood that the present invention could be realized in hardware, software, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, view rewrite system 34 is shown with a certain configuration of sub-systems for illustrative purposes only.

We claim:

1. A computer implemented method for rewriting view statements in Structured Query Language (SQL) statements, the method comprising the steps of:
   a computer receiving a SQL statement with a full select portion having a reference to a view that contains a join operation;
   in response to the full select portion having a reference to a view that contains a join operation, the computer moving the reference to the view out of the full select portion;
   the computer resolving the view and the join operation separately from the SQL statement, and the computer creating in memory a temporary table with a result of the resolving; and
   the computer inserting a reference to the temporary table, instead of the result of the resolving, in the full select portion.

2. The method of claim 1, wherein the join operation is a left outer join operation.

3. The method of claim 2, wherein the left outer join operation joins a plurality of tables into a single table.

4. The method of claim 1, wherein the full select portion defines search criteria for the SQL statement.

5. The method of claim 1, wherein the full select portion comprises a SQL predicate.

6. The method of claim 5, wherein the SQL predicate defines a boundary of the SQL statement.

7. A computer system for rewriting view statements in Structured Query Language (SQL) statements, the computer system comprising:
   a central processing unit, a random access memory, and a computer readable storage media;
   first program instructions to receive a SQL statement with a full select portion having a reference to a view that contains a join operation;
   second program instructions, responsive to the full select portion having a reference to a view that contains a join operation, to move the reference to the view out of the full select portion;
   third program instructions to resolve the view and the join operation separately from the SQL statement, and create a temporary table with a result of the third program instructions resolving the view and the join operation separately from the SQL statement; and
   fourth program instructions to insert a reference to the temporary table, instead of the result of the third program instructions resolving the view and the join operation separately from the SQL statement, in the full select portion and thereafter perform the SQL statement; and wherein
   the first, second, third and fourth program instructions are stored on the computer readable storage media for execution by the central processing unit via the random access memory.

8. The computer system of claim 7 wherein the second program instructions are responsive to the full select portion having a reference to a view that does not contain a join operation to avoid moving the reference to the view out of the full select portion.

9. The computer system of claim 7, wherein the join operation is a left outer join operation.

10. The computer system of claim 9, wherein the left outer join operation joins a plurality of tables into a single table.

11. The computer system of claim 7, wherein the full select portion defines search criteria for the SQL statement.

12. The computer system of claim 7, wherein the full select portion comprises a SQL predicate.

13. The computer system of claim 12, wherein the SQL predicate defines a boundary of the SQL statement.

14. A computer program product for rewriting view statements in Structured Query Language (SQL) statements, the computer program product comprising:
   a computer readable storage medium;
   first program code for receiving a SQL statement with a full select portion having a reference to a view that contains a join operation;
   second program code, responsive to the full select portion having a reference to a view that contains a join operation, for moving the reference to the view out of the full select portion;
   third program code for resolving the view and the join operation separately from the SQL statement, and creating a temporary table with a result of the resolving; and fourth program code for inserting a reference to the temporary table, instead of the results of the third program code resolving the view and the join operation separately from the SQL statement, in the full select portion and thereafter performing the SQL statement; and wherein the first, second, third and fourth program code are stored on the computer readable storage medium for execution by a CPU.

15. The computer program product of claim 14, wherein the join operation is a left outer join operation.

16. The computer program product of claim 15, wherein the left outer join operation joins a plurality of tables into a single table.

17. The computer program product of claim 14, wherein the full select portion defines search criteria for the SQL statement.

18. The computer program product of claim 14, wherein the full select portion comprises a SQL predicate.

19. The computer program product of claim 18, wherein the SQL predicate defines a boundary of the SQL statement.

20. The computer program product of claim 14 wherein the second program code is responsive to the full select portion having a reference to a view that does not contains a join operation, to avoid moving the reference to the view out of the full select portion.

21. A computer implemented method for rewriting view statements in Structured Query Language (SQL) statements, the method comprising the steps of:

a computer receiving a SQL statement with a full select portion having a reference to a view that contains a join operation;

the computer responding to the full select portion having a reference to a view that contains a join operation, by moving the reference to the view out of the full select portion;

the computer resolving the view and the join operation separately from the SQL statement, and the computer creating in memory a temporary table with a result of the resolution; and the computer inserting a reference to the temporary table, instead of the results of the resolving step, in the full select portion and subsequently executing the SQL statement with a central processing unit.

* * * * *